United States Patent
Freund et al.

(10) Patent No.: US 8,463,796 B1
(45) Date of Patent: Jun. 11, 2013

(54) SYSTEM AND METHOD FOR PROVIDING NOTED ITEMS

(75) Inventors: Martin Freund, Mountain View, CA (US); Momchil Filev, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/481,754

(22) Filed: May 25, 2012

(51) Int. Cl.
G06F 17/30 (2006.01)

(52) U.S. Cl.
USPC ............ 707/748; 707/621; 713/375; 709/246

(58) Field of Classification Search
USPC ............ 707/706, 748, 621; 709/246; 713/375
See application file for complete search history.

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,739,408 | B2 * | 6/2010 | Fish et al. ............... 709/246 |
| 7,742,468 | B2 | 6/2010 | Vagelos |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2008/0056475 | A1 | 3/2008 | Brannick et al. |
| 2008/0192656 | A1 | 8/2008 | Vagelos |
| 2011/0098156 | A1 | 4/2011 | Ng et al. |

FOREIGN PATENT DOCUMENTS

WO WO02079984 10/2002

OTHER PUBLICATIONS

Adamic et al., "A Social Network Caught in the Web," Internet Journal, First Monday, Jun. 2, 2003, vol. 8, No. 6, pp. 1-22.
Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

(Continued)

Primary Examiner — Belix M Ortiz Ditren
(74) Attorney, Agent, or Firm — Patent Law Works LLP

(57) ABSTRACT

A system and associated methods for providing electronically noted items are disclosed. The noting application includes a communication module, a determination module, a ranking module and a presentation module. The communication module receives a request for electronically noted items from a first user and user identification data identifying the first user. The determination module determines one or more second users related to the first user based at least in part on the user identification data. The determination module retrieves a first set of two or more electronically noted items marked by the one or more second users. The ranking module ranks the first set of two or more electronically noted items to generate a second set of two or more electronically noted items. The presentation module provides for display the second set of two or more electronically noted items to the first user.

21 Claims, 12 Drawing Sheets

OTHER PUBLICATIONS

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

* cited by examiner

350

Customizing Your Own List of +1'ed Items

- Please specify a type of +1'ed items you would like to include in your list. — 352

○ Ads    ○ Articles    ○ Sites    ○ Other (Please specify)

- Please specify one or more circles in your list. — 354

○ Friends    ○ Family    ○ Public    ○ Other (Please specify)

- Please specify a period of time in your list. — 356

○ Today    ○ This week    ○ This Month    ○ Other (Please specify)

- Please specify a number of +1'ed items you would like to include in your list. — 358

○ 10    ○ 20    ○ 30    ○ Other (Please specify)

[ Create List ]    [ Cancel ]

Trending Products Search

Wondering what are the most popular products? Try it out! Just simply select the demographics information below and get the trending products by an easy "search."

- Gender
  - ○ Male    ○ Female

- Age
  - ○ Under 20   ○ 20-30   ○ 30-40   ○ Above 40

- Education
  - ○ High school   ○ College   ○ Graduate School

- Location
  - ○ U.S.A.   ○ Canada   ○ Europe   ○ Asia

372

Other demographics information:

[Please provide additional information here...] — 374

[Search]   [Cancel]

SYSTEM AND METHOD FOR PROVIDING NOTED ITEMS

BACKGROUND

The specification relates to processing noted items. In particular, the specification relates to customizing and providing noted items to users.

Over the last decade, social networking has become increasingly popular. People frequently show their approval or disapproval for websites, posts, videos, advertisements and comments by clicking indication of approval buttons. Currently, there is no way for a user to easily browse items approved or disapproved by other users from the user's social connections. For example, a user cannot browse top 10 sites or ads that have most indications of approval from the user's social connections such as a friend circle, a family circle, etc.

SUMMARY

In some examples, the specification describes a system and associated method for providing electronically noted items to a first user. The system includes a noting application that comprises a communication module, an aggregation module, a determination module, a customization module, a ranking module, a presentation module and a user interface module. The communication module receives a request for electronically noted items from a first user and user identification data identifying the first user. The determination module determines one or more second users related to the first user and retrieves a first set of two or more electronically noted items marked by the one or more second users from a storage device. The ranking module ranks the first set of two or more electronically noted items to generate a second set of two or more electronically noted items. The presentation module provides the second set of two or more electronically noted items to the first user. In one embodiment, the presentation module instructs the user interface module to generate graphical data for providing a user interface that depicts the second set of two or more electronically noted items to the first user.

The description also includes a method, executing on one or more computing devices, for providing electronically noted items that comprises receiving a request for electronically noted items from a first user, determining one or more second users related to the first user, retrieving a first set of two or more electronically noted items marked by the one or more second users, ranking the first set of two or more electronically noted items to generate a second set of two or more electronically noted items and providing the second set of two or more electronically noted items to the first user. In one embodiment, the second set of two or more electronically noted items is presented to the first user using a list view approach and/or a full screen view approach via a user interface.

In one embodiment, the second set of two or more electronically noted items includes two or more approved items. In another embodiment, the second set of two or more electronically noted items includes two or more disapproved items. In yet another embodiment, the second set of two or more electronically noted items includes one or more lists of approved items and/or one or more lists of disapproved items.

In one embodiment, the determination module determines the one or more second users related to the first user as other users from one or more social categories of the first user. For example, the one or more second users are members from the first user's social circles. In another embodiment, the determination module determines the one or more second users as other users having a noting pattern related to a first noting patter of the first user. For example, the one or more second users are users whose noting pattern includes at least 80% of the same approved items included in the first noting pattern.

BRIEF DESCRIPTION OF THE DRAWINGS

The specification is illustrated by way of example, and not by way of limitation in the figures of the accompanying drawings in which like reference numerals are used to refer to similar elements.

FIG. 3C is one example of a graphic representation of a user interface for customizing noted items according to one embodiment.

FIG. 3D is one example of a graphic representation of a user interface for customizing a search result for noted items according to one embodiment.

DETAILED DESCRIPTION

Example Overview

Figure 1:
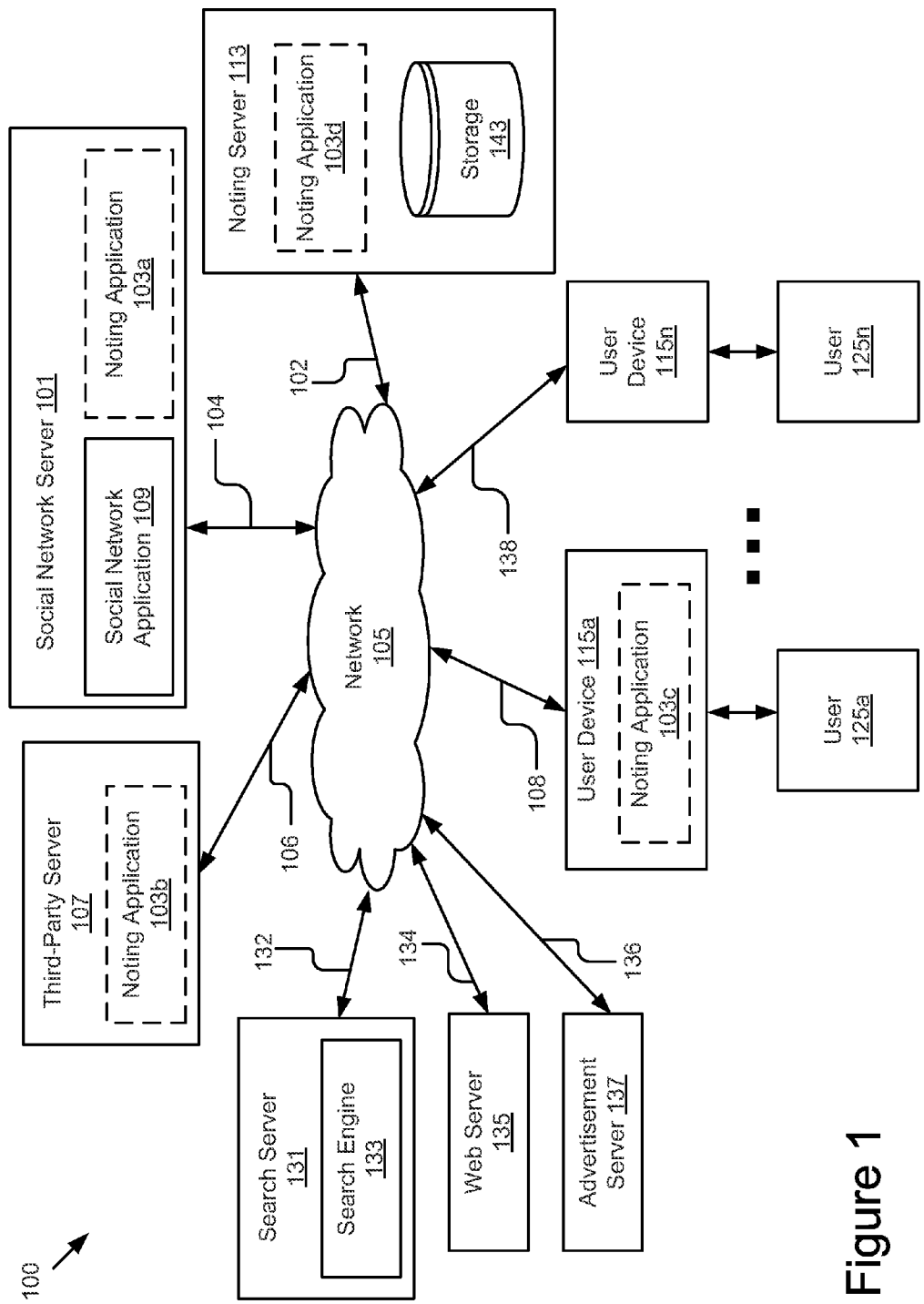
FIG. 1 is a high-level block diagram illustrating one embodiment of a system for providing noted items to users.

The description includes a system and method for providing noted items to a first user. A noted item is content electronically marked by one or more users. A noted item is also referred to as an electronically noted item herein. In one embodiment, a noted item is an approved item electronically approved by one or more users. For example, a noted item includes any online content (e.g., a picture, a video, an article, an advertisement, a post, any online service, etc.) for which one or more users have clicked an indication of approval (e.g., a "+1" button, a "like" button, a "favorite" button, a "thumb up" button, etc.). In another embodiment, a noted item is a disapproved item electronically disapproved by one or more users. For example, a noted item includes online content for which one or more users have clicked an indication of disapproval (e.g., a "−1" button, a "dislike" button, a "thumb down" button, a "boring" button, etc.). The system includes a noting application for providing the noted items to a first user.

As an example of the use of the system, a user may request, and the system may provide a number of noted items. For example, in some of the implementations, a user may request (e.g., either explicitly or implicitly) and receive an indication of Top 20 +1'ed sites by the user's social connections, Top 25 +1'ed advertisements by the user's Family circle, Top 10 +1'ed men's clothing e-commerce sites by the user's Work circle, Top 100 +1'ed articles today by the user's Well-Read Friends circle, etc. In another example, a user may request and receive an indication of Top 10 most hated movies by the user's Friend circle, Top 20 most boring books based on ratings from the user's social connections such as circles or similar raters.

In some embodiments, the noting application includes a communication module, a determination module, a customization module, a ranking module and a presentation module. The communication module receives user identification data (e.g., a user name, a password, an email address, an Internet Protocol (IP) address, etc.) identifying the first user from a user device. The determination module determines one or more second users related to the first user. The communication module retrieves a first set of noted items marked by the one or more second users from a storage device. Optionally, the customization module customizes the first set of noted items based at least in part on one or more customization inputs from the first user. The ranking module ranks the first set of noted items to generate a second set of noted items. The presentation module presents the second set of noted items to the first user.

As an example implementation, the noting application matches profiles between the first user and any other users based on the noted items (e.g., the +1'ed items) marked by the first user and the other users. The noting application determines, based on the profile matching, other users similar to the first user as those having identical or similar noting patterns as the first user. For example, if a first user in a social network has approved (e.g., +1'ed) a total of 37 sites, 16 articles and 7 ads, the noting application determines other users similar to the first user as those in the same social network that have +1'ed the same sites, articles and ads or a portion of the same sites, articles and ads (e.g., 60% of the sites, articles and ads). The noting application retrieves other +1'ed items approved by the other similar users (e.g., other sites, articles, ads, videos, etc., that are approved by the other similar users and not yet approved by the first user) and provides the other +1'ed items to the first user. The first user may browse through the other +1'ed items approved by the other similar users in a full screen view or in a list overview via a user interface.

In one embodiment, the determination module retrieves a noting profile associated with the first user from a storage device and determines, based at least in part on the noting profile, a first noting pattern associated with the first user. The term noting profile as used herein encompasses its plain and ordinary meaning including, but not limited to, a profile describing an aggregation of items noted by a user. A noting pattern is data describing a pattern in a noting profile. For example, a noting profile for a first user includes data describing that in a first day the first user has visited 50 online services and approved 10 articles and 8 ads from the 50 online services, and in the next day the first user has viewed 10 videos and approved 2 of the videos. The 10 approved articles, 8 approved ads and 2 approved videos form a noting pattern for the first user. In another example, a noting profile indicates that the first user has approved 10 ads and disapproved 5 videos from 20 online services in a week, and the 10 approved ads and the 5 disapproved videos form a noting pattern for the first user.

In one embodiment, the determination module determines the one or more second users related to the first user as one or more other users each having a second noting pattern related to the first noting pattern of the first user. For example, the determination module determines the one or more second users as one or more other users who have the same noting pattern as the first user. In another example, the determination module determines the one or more second users as other users each having a second noting pattern related to the first noting pattern of the first user.

In another embodiment, the determination module receives an indication of one or more social categories from the first user via the communication module. A social category is a grouping of one or more social connections. For example, a social category includes one or more circles in a social network (e.g., a g+ circle). The determination module determines the one or more second users related to the first user as one or more other users within the one or more social categories of the first user. For example, if the social category specified by the first user is a "friend" circle, the determination module determines the one or more second users as members from the "friend" circle.

System Overview

FIG. 1 illustrates a block diagram of a system 100 for providing noted items according to some examples. The illustrated description of the system 100 includes user devices 115*a* . . . 115*n* that are accessed by users 125*a* . . . 125*n*, a social network server 101 and a noting server 113. In some embodiments, the system 100 additionally includes one or more of a third-party server 107, a search server 131, a web server 135 and an advertisement ("ad") server 137. The entities of the system 100 are communicatively coupled via a network 105. In FIG. 1 and the remaining figures, a letter after a reference number, such as "115*a*" is a reference to the element having that particular reference number. A reference number in the text without a following letter, such as "115," is a general reference to any or all instances of the element bearing that reference number.

The user devices 115*a* . . . 115*n* in FIG. 1 are used by way of example. While FIG. 1 illustrates two user devices 115*a* and 115*n*, the present disclosure applies to any system architecture having one or more user devices 115. Although only two user devices 115 are illustrated, any numbers of user devices 115 are available to any number of users 125. Furthermore, while only one network 105 is coupled to the user devices 115, the social network server 101, the third-party server 107, the noting server 113, the search server 131, the web server 135 and the ad server 137, in practice any number of networks 105 can be connected to these entities. Furthermore, while only one third-party server 107, one search server 131, one web server 135 and one ad server 137 are shown, the architecture 100 could include any number of third-party servers 107, search servers 131, web servers 135 and ad servers 137.

The network 105 is a conventional type, wired or wireless, and may have numerous different configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In one embodiment, the noting application 103*a* is operable on the social network server 101, which is coupled to the network 105 via signal line 104. The social network server 101 sends and receives data to and from one or more of the user devices 115a, 115n and the noting server 113 via the network 105. For example, the social network server 101 is a hardware server. The social network server 101 also includes a social network application 109. A social network is any type of social structure where the users are connected by a common feature. The common feature includes relationships/connections, e.g., friendship, family, work, an interest, etc. The common features are provided by one or more social networking systems, such as those included in the architecture 100, including explicitly defined relationships and relationships implied by social connections with other online users, where the relationships form a social graph. In some examples, the social graph can reflect a mapping of these users and how they are related. Furthermore, it should be understood that the social network server 101 and the social network application 109 are representative of one social network and that there may be multiple social networks coupled to the network 105, each having its own server, application and social graph. For example, a first social network is more directed to business networking, a second is more directed to or centered on academics, a third is more directed to local business, a fourth is directed to dating and others are of general interest or a specific focus.

In another embodiment, the noting application 103b is operable on a third-party server 107, which is connected to the network 105 via signal line 106. In some embodiments, the third-party server 107 is any computing device such as a hardware server including a processor, a memory and network communication capabilities. The third-party server 107 sends and receives data to and from other entities of the system 100 via the network 105.

In yet another embodiment, the noting application 103c is stored on a user device 115a, which is connected to the network 105 via signal line 108. The user device 115a, 115n is any computing device that includes a memory and a processor, for example a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. The user 125a interacts with the user device 115a. The user 125n interacts with the user device 115n, which is communicatively coupled to the network 105 via signal line 138. In one embodiment, the noting application 103c acts in part as a thin-client application that is stored on the user device 115a, 115n and in part as components that are stored on one or more of the social network server 101, the third-party server 107 and the noting server 113.

In yet another embodiment, the noting application 103d is operable on the noting server 113, which is connected to the network 105 via signal line 102. In some embodiments, the noting server 113 is any computing device such as a hardware server including a processor, a memory and network communication capabilities. The noting server 113 sends and receives data to and from other entities of the system 100 via the network 105. In the illustrated embodiment, the noting server 113 additionally includes a storage device 143.

The noting application 103 is code and routines for providing noted items. In one embodiment, the noting application 103 receives (either explicitly or implicitly) a request for noted items from a first user. The noting application 103 determines one or more other users related to the first user and retrieves a first set of noted items marked by the other users. Optionally, the noting application 103 receives customization inputs from the first user and customizes the first set of noted items based at least in part on the customization inputs. The noting application 103 ranks the first set of noted items to generate a second set of noted items and provides for display the second set of noted items to the first user. The noting application 103 is described in further detail below with reference to FIGS. 2B-6B.

The storage 143 is a non-transitory memory that stores data necessary for the functionality of the noting application 103. The storage 143 may be a dynamic random access memory (DRAM) device, a static random access memory (SRAM) device, flash memory or some other memory device known in the art. In one embodiment, the storage 143 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The storage 143 is described in more detail below with reference to FIG. 2A.

The search server 131 is any computing device. For example, the search server 131 is a hardware server including a processor, a memory and network communication capabilities. The search server 131 is communicatively coupled to the network 105 via signal line 132 for sending data to and/or receiving data from other entities of the system 100. In the illustrated embodiment, the search server 131 includes a search engine 133. The search engine 133 is code and routines for retrieving results that match search terms from the Internet.

The web server 135 is any computing device. For example, the web server 135 is a hardware server including a processor, a memory and network communication capabilities. The web server 135 is communicatively coupled to the network 105 via signal line 134 for sending data to and/or receiving data from other entities of the system 100. In one embodiment, the web server 135 provides one or more online services (e.g., web pages, online videos, etc.) to a user device 115 responsive to a request for online services from a user 125, allowing the user 125 to mark the one or more online services as one or more noted items using the user device 115. In another embodiment, the web server 135 provides online services to other entities such as the social network server 101, the third-party server 107, the noting server 113, the search server 131 and the ad server 137 responsive to a request for the online services from the other entities.

The ad server 137 is any computing device. For example, the ad server 137 is a hardware server including a processor, a memory and network communication capabilities. The ad server 137 is communicatively coupled to the network 105 via signal line 136 for sending data to and/or receiving data from other entities of the system 100. In one embodiment, the ad server 137 hosts advertisement content (e.g., an ad video, an ad audio file, an ad image, an ad text file, etc.) in a storage device (not pictured), and provides the advertisement content to the other entities such as the social network server 101, the third-party server 107, the noting server 113, the search server 131, the web server 135 and the user device 115 responsive to a request for the advertisement content from the other entities.

As described below in more detail with reference to FIGS. 2A-6B, the system 100 is particularly advantageous since, for example, it enables a user to discover new content on the web based on noted items marked by the user in the past. The system 100 therefore provides a better web surfing experience to the user.

Example System

Figure 2A:
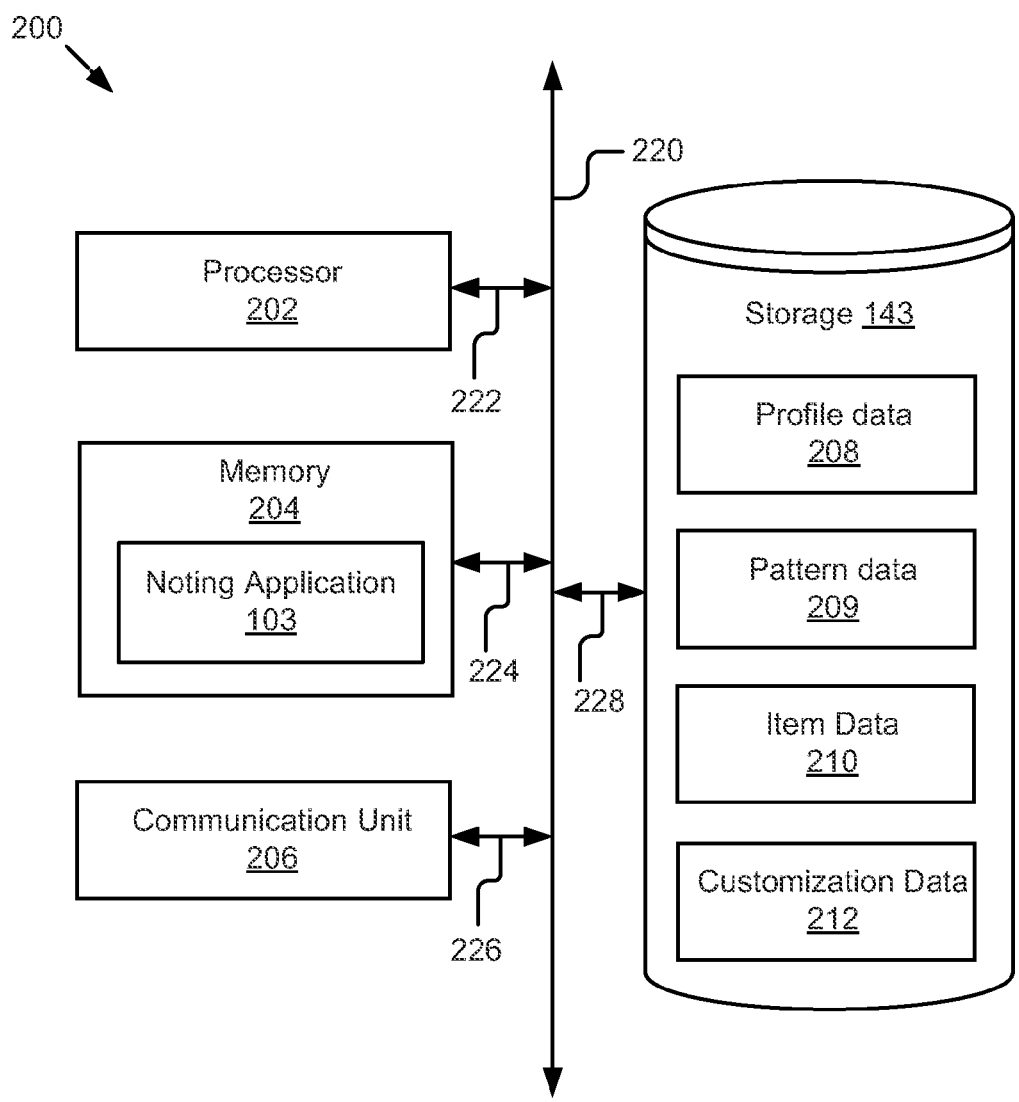
FIG. 2A is a block diagram illustrating one embodiment of hardware implementing the functionality of providing noted items to users.

Referring now to FIG. 2A, the hardware implementing the functionality of providing noted items to users is shown in more detail. FIG. 2A is a block diagram of a computing device 200 that includes a processor 202, a memory 204, a communication unit 206 and a storage device 143 according to some examples. The components of the computing device 200 are communicatively coupled by a bus 220. In some embodiments, the computing device 200 is one of a social network server 101, a user device 115, a third-party server 107 and a noting server 113.

The processor 202 comprises an arithmetic logic unit, a microprocessor, a general purpose controller or some other processor array to perform computations and provide electronic display signals to a display device. The processor 202 is coupled to the bus 220 for communication with the other components via signal line 222. Processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 204 stores instructions and/or data that may be executed by the processor 202. In one embodiment, the memory 204 includes the noting application 103. The memory 204 is coupled to the bus 220 for communication with the other components via signal line 224. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 206 transmits and receives data to and from at least one of the user device 115, the third-party server 107, the noting server 113 and the social network server 101 depending upon where the noting application 103 is stored. The communication unit 206 is coupled to the bus 220 via signal line 226. In one embodiment, the communication unit 206 includes a port for direct physical connection to the network 105 or to another communication channel. For example, the communication unit 206 includes a USB, SD, CAT-5 or similar port for wired communication with the user device 115. In another embodiment, the communication unit 206 includes a wireless transceiver for exchanging data with the user device 115 or any other communication channel using one or more wireless communication methods, such as IEEE 802.11, IEEE 802.16, BLUETOOTH® or another suitable wireless communication method.

In yet another embodiment, the communication unit 206 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 206 includes a wired port and a wireless transceiver. The communication unit 206 also provides other conventional connections to the network for distribution of files and/or media objects using standard network protocols such as TCP/IP, HTTP, HTTPS and SMTP as will be understood to those skilled in the art.

In the illustrated embodiment, the storage 143 is communicatively coupled by the bus 220 for communication with the other components of the computing device 200 via signal line 228. In some embodiments, the storage device 143 is not included in the computing device 200 and is communicatively coupled to the computing device 200 via a network 105. The data stored in the storage 143 includes profile data 208, pattern data 209, item data 210 and customization data 212.

The profile data 208 is data describing one or more noting profiles for one or more users. For example, the profile data 208 includes data describing that in a first day a user has visited 20 web pages and clicked an indication of approval (e.g., a "g+" button) for 5 videos and in a second day the user has visited 30 web pages and clicked an indication of disapproval (e.g., a thumb down button) for 3 photos.

The pattern data 209 is data describing one or more noting patterns for one or more users. In one embodiment, a noting pattern is an approval pattern that is formed by approved items. For example, a noting pattern includes reference to all the noted items approved by a user. In another embodiment, a noting pattern is a disapproval pattern that is formed by disapproved items. For example, a noting pattern includes reference to all the noted items disapproved by the user. In yet another embodiment, a noting pattern is a combination of the approval pattern and the disapproval pattern. For example, a noting pattern includes reference to all the noted items approved or disapproved by the user.

The item data 210 is data describing one or more noted items marked by one or more users. For example, the item data 210 is data describing noted items such as sites, articles, videos, photos, posts and other online services approved or disapproved by one or more users.

The customization data 212 is data for customizing presentation of noted items to users. For example, the customization data 212 includes one or more customization inputs received from users. Examples of a customization input include, but not limited to, a type of content (e.g., sites, articles, ads, videos, music, movies, games, and any other types of online services), one or more social categories (e.g., a "friend" circle, a "family" circle, a "coworker" circle, a public or private community, etc.), a period of time during which the noted items are published (e.g., today, a week ago, this month, this year, etc.), a number of noted items included in a list (e.g., 10 noted items in each list), a noting type for the noted items (e.g., approved items only, disapproved items only, a combination of approved items and disapproved items, etc.) and demographics information (e.g., location, age, gender, education experience, etc.), etc.

Example Application

Figure 2B:
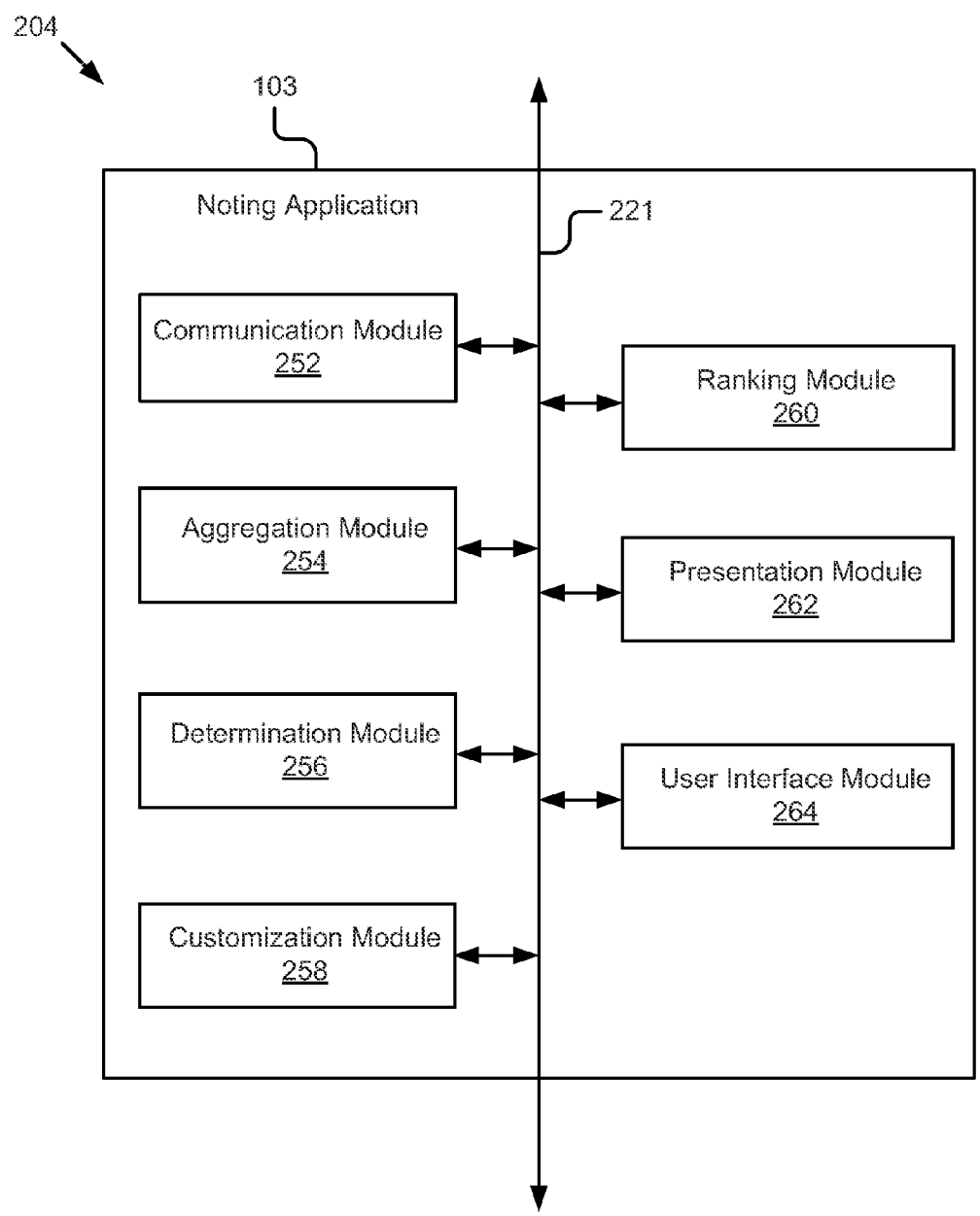
FIG. 2B is a block diagram illustrating one embodiment of a noting application.

Referring now to FIG. 2B, the noting application 103 is shown in more detail. In one embodiment, the noting application 103 comprises a communication module 252, an aggregation module 254, a determination module 256, a customization module 258, a ranking module 260, a presentation module 262 and a user interface module 264 that communicate over the software communication mechanism 221. Software communication mechanism 221 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc). The software communication can be implemented on any underlying hardware, such as a network, the Internet, a bus 220, a combination thereof, etc.

The communication module 252 is software including routines for handling communications between the noting application 103 and other components of the computing device 200. In one embodiment, the communication module 252 is a set of instructions executable by the processor 202 to provide the functionality described below for handling communications between the noting application 103 and other components of the computing device 200. In another embodiment, the communication module 252 is stored in the memory 204 of the computing device 200 and is accessible and executable by the processor 202. In either embodiment, the communication module 252 is adapted for cooperation and communication with the processor 202 and other components of the computing device 200.

The communication module 252 sends and receives data, via the communication unit 206, to and from one or more of a user device 115, a social network server 101, a third-party server 107, a search server 131, a web server 135 and an ad server 137. For example, the communication module 252 receives, via the communication unit 206, a noting indication from a user device 115 and transmits the indication to the aggregation module 254. A noting indication is one of an indication of approval and an indication of disapproval. In one embodiment, a user clicks a noting indication button such as an indication of approval button, usually in the form of text or an image, for example, a like, a thumb up or a +1, on a user device 115. After the user clicks the button, the communication module 252 receives the noting indication from the user device 115.

In one embodiment, the communication module 252 receives a request for noted items (e.g., a request for top 10 +1'ed songs approved by friends, a request for top 10 boring movies rated by users from a friend circle and/or a family circle, etc.) from a first user. The communication module 252 also receives user identification data identifying the first user such as a user name, a password, an IP address, an email address, etc. The communication module 252 sends the request and the user identification data to the determination module 256. In another embodiment, the communication module 252 receives one or more customization inputs from a first user and sends the one or more customization inputs to the customization module 258. In yet another embodiment, the communication module 252 receives a set of noted items from the presentation module 262 and sends the set of noted items to a user device 115 for display to the first user.

In one embodiment, the communication module 252 receives data from components of the noting application 103 and stores the data in the storage 143. For example, the communication module 252 receives pattern data describing a noting pattern from the determination module 256 and stores the pattern data in the storage 143. In another embodiment, the communication module 252 retrieves data from the storage 143 and sends the data to components of the noting application 103. For example, the communication module 252 retrieves profile data describing a noting profile of a user from the storage 143 and sends the profile data to the determination module 256.

The aggregation module 254 is software including routines for aggregating noted items. In one embodiment, the aggregation module 254 is a set of instructions executable by the processor 202 to provide the functionality described below for aggregating noted items. In another embodiment, the aggregation module 254 is stored in the memory 204 of the computing device 200 and is accessible and executable by the processor 202. In either embodiment, the aggregation module 254 is adapted for cooperation and communication with the processor 202 and other components of the computing device 200.

In one embodiment, the aggregation module 254 receives one or more noting indications (e.g., indications of approval or indications of disapproval) for one or more noted items from one or more user devices 115, and aggregates the one or more noting indications per user, per noting type and per type of content. For example, the aggregation module 254 aggregates the noting indications for each user according to the noting types (e.g., approved items or disapproved items) and the type of content (e.g., video, article, etc.) so that a first aggregation result includes all the approved videos marked by the user, a second aggregation result includes all the disapproved videos marked by the user, a third aggregation result includes approved articles marked by the user and a fourth aggregation result includes disapproved articles marked by the user, etc. The aggregation module 254 stores the one or more noted items as item data in the storage 143. The aggregation module 254 also stores reference to the noted items (e.g., identifiers of the noted items) and the aggregation results in the storage 143 as profile data for each user.

The determination module 256 is software including routines for determining one or more second users related to a first user. In one embodiment, the determination module 256 is a set of instructions executable by the processor 202 to provide the functionality described below for determining one or more second users related to a first user. In another embodiment, the determination module 256 is stored in the memory 204 of the computing device 200 and is accessible and executable by the processor 202. In either embodiment, the determination module 256 is adapted for cooperation and communication with the processor 202 and other components of the computing device 200.

In one embodiment, the determination module 256 receives a request for noted items (e.g., either explicitly or implicitly) from a first user operating on a user device 115 via the communication module 252. The determination module 256 receives user identification data identifying the first user such as a user name, a password, an email address, an IP address, etc. The determination module 256 retrieves a noting profile associated with the first user from a storage device 143 based at least in part on the user identification data. The determination module 256 determines a first noting pattern associated with the first user from the noting profile. For example, if the noting profile indicates that the first user has approved 10 ads and disapproved 5 videos so far, the determination module 256 determines the first noting pattern of the first user as a pattern formed by the 10 approved ads and 5 disapproved videos.

In one embodiment, the request received from the first user includes a noting type for the noted items and the determination module 256 determines the first noting pattern for the first user further based on the noting type. For example, assume the noting profile indicates that the first user has approved 10 ads and disapproved 5 videos so far. If the request indicates that the first user only requests for noted items with indications of approval, the determination module 256 determines the first noting pattern as a pattern formed by the approved items marked by the first user such as the 10 approved ads. However, if the request indicates that the first user only requests for noted items with indications of disapproval, the determination module 256 determines the first noting pattern as a pattern formed by the disapproved items marked by the first user such as the 5 disapproved videos. If the request indicates that the first user requests for noted items either with indications of approval or indications of disapproval, the determination module 256 determines the first noting pattern as a pattern formed by the noted items either approved or disapproved by the first user such as the 10 approved ads and the 5 disapproved videos.

In one embodiment, the determination module 256 determines the one or more second users related to the first user as one or more other users that have one or more second noting patterns related to the first noting pattern of the first user. In some examples, if at least a predetermined portion of noted items in the first noting pattern is also present in a second noting pattern, the second noting pattern is determined to be related to the first noting pattern. For example, if more than 80% of the noted items included in the first noting pattern are also included in the second noting pattern, the second noting pattern is determined to be related to the first noting pattern. In another example, the one or more second users related to the first user are users who have the same noting pattern as the first user. In one embodiment, if the one or more second users related to the first user are not connected to the first user in a social network, the determination module 256 provides a suggestion to the first user that recommends the first user to add the one or more second users to the first user's social circles.

In another embodiment, the determination module 256 receives an indication of one or more social categories (e.g., a friend circle, a family circle, a public circle, etc.) from the first user via the communication module 252. The determination module 256 determines the one or more second users related to the first user as one or more other users from the one or more social categories of the first user. For example, if the social category specified by the first user is a "coworker" circle, the determination module 256 determines the one or more second users as other members from the first user's "coworker" circle.

In either embodiment, the determination module 256 retrieves a first set of noted items marked by the one or more second users from the storage 143. In some examples, the first set of noted items includes noted items that have been marked by the one or more second users and not marked by the first user yet. In one embodiment, the determination module 256 retrieves the first set of noted items further based on the noting type included in the received request. For example, if the noting type indicates noted items with indications of approval, the determination module 256 retrieves a set of approved items approved by the one or more second users and not yet approved by the first user from the storage 143. In another example, if the noting type indicates noted items with indications of disapproval, the determination module 256 retrieves a set of disapproved items disapproved by the one or more second users and not yet disapproved by the first user from the storage 143. The determination module 256 sends the first set of noted items to one or more of the customization module 258, the ranking module 260 and the presentation module 262.

The customization module 258 is software including routines for customizing noted items for presentation to a user. In one embodiment, the customization module 258 is a set of instructions executable by the processor 202 to provide the functionality described below for customizing noted items for presentation to a user. In another embodiment, the customization module 258 is stored in the memory 204 of the computing device 200 and is accessible and executable by the processor 202. In either embodiment, the customization module 258 is adapted for cooperation and communication with the processor 202 and other components of the computing device 200.

In one embodiment, the customization module 258 receives one or more customization inputs from a first user via the communication module 252. In another embodiment, the customization module 258 retrieves one or more customization inputs from the storage 143. Examples of a customization input include, but not limited to, a type of content (e.g., sites, articles, books, movies, pictures, etc.), one or more social categories (e.g., a friend circle, a family circle, a public circle, etc.), a period of time during which the noted items are published, a number of noted items included in a list for presentation, personal interests, hobbies, and any other demographics information (e.g., gender, age, education experience, working experience, location, etc.), etc.

The customization module 258 receives a first set of noted items from the determination module 256 and customizes the first set of noted items based at least in part on the one or more customization inputs. For example, if a customization input indicates that a type of content is "movie," the customization module 258 customizes the first set of noted items by deleting any noted items not related to any movies from the first set of noted items. The customization module 258 sends the customized set of noted items to one or more of the ranking module 260 and the presentation module 262.

The ranking module 260 is software including routines for ordering noted items for presentation to users. In one embodiment, the ranking module 260 is a set of instructions executable by the processor 202 to provide the functionality described below for ordering noted items for presentation to users. In another embodiment, the ranking module 260 is stored in the memory 204 of the computing device 200 and is accessible and executable by the processor 202. In either embodiment, the ranking module 260 is adapted for cooperation and communication with the processor 202 and other components of the computing device 200.

In one embodiment, the ranking module 260 receives a first set of noted items from the determination module 256. In another embodiment, the ranking module 260 receives a first set of noted items from the customization module 258. The ranking module 260 ranks the noted items included in the first set to generate a second set of noted items. For example, the ranking module 260 determines a count of noting indications (e.g., the number of indications of approval, or the number of indications of disapproval) marked by the one or more second users for each of the noted items included in the first set. The ranking module 260 orders the noted items in the first set based at least in part on counts of noting indications for the noted items and generates a second set of noted items after the ordering. In one embodiment, the second set of noted items includes noted items such that a first noted item with more counts of noting indications has a higher ranking than a second noted item with less counts of noting indications. The ranking module 260 sends the second set of noted items to the presentation module 262.

For example, if the first set of noted items includes one or more approved items approved by the one or more second users, the ranking module 260 ranks the one or more approved items according to the number of indications of approval marked by the one or more second users for each approved item. The ranking module 260 generates a second set of noted items such that a first approved item whose number of indications of approval is greater than that of a second approved item has a higher ranking than the second approved item (e.g., the first approved item is listed before the second approved item in the second set).

In another example, if the first set of noted items includes one or more disapproved items marked by the one or more second users, the ranking module 260 ranks the one or more disapproved items according to the number of indications of disapproval marked by the one or more second users for each disapproved item. The ranking module 260 generates a second set of noted items such that a first disapproved item whose number of indications of disapproval is greater than that of a second disapproved item has a higher ranking than the second disapproved item (e.g., the first disapproved item is listed before the second disapproved item in the second set).

In yet another example, if the first set of noted items includes one or more approved items and one or more disapproved items marked by the one or more second users. The ranking module 260 ranks the one or more approved items and generates a list of approved items. For example, the ranking module 260 ranks the one or more approved items and generates a list of approved items such that a first approved item whose number of indications of approval is greater than that of a second approved item has a higher ranking than the second approved item. The ranking module 260 also ranks the one or more disapproved items and generates a list of disapproved items such that a first disapproved item whose number of indications of disapproval is greater than that of a second disapproved item has a higher ranking than the second disapproved item. The second set of noted items includes the list of approved items and the list of disapproved items.

The presentation module 262 is software including routines for presenting noted items to users. In one embodiment, the presentation module 262 is a set of instructions executable by the processor 202 to provide the functionality described below for presenting noted items to users. In another embodiment, the presentation module 262 is stored in the memory 204 of the computing device 200 and is accessible and executable by the processor 202. In either embodiment, the presentation module 262 is adapted for cooperation and communication with the processor 202 and other components of the computing device 200.

In one embodiment, the presentation module 262 receives a first set of noted items from one of the determination module 256 and the customization module 258. The presentation module 262 presents the first set of noted items to a user. For example, the presentation module 262 instructs the user interface module 264 to generate graphical data for providing a user interface and send the graphical data to a user device 115, causing the user device 115 to provide the user interface depicting the first set of noted items to the user.

In another embodiment, the presentation module 262 receives a second set of noted items from the ranking module 260 and determines one or more top-ranking noted items from the second set. The one or more top-ranking noted items are one or more noted items having higher ranking than other noted items in the second set. For example, the one or more top-ranking noted items are one or more approved items having greater counts of indications of approval than other approved items. In another example, the one or more top-ranking noted items are one or more disapproved items having greater counts of indications of disapproval than other disapproved items.

Figure 3A:
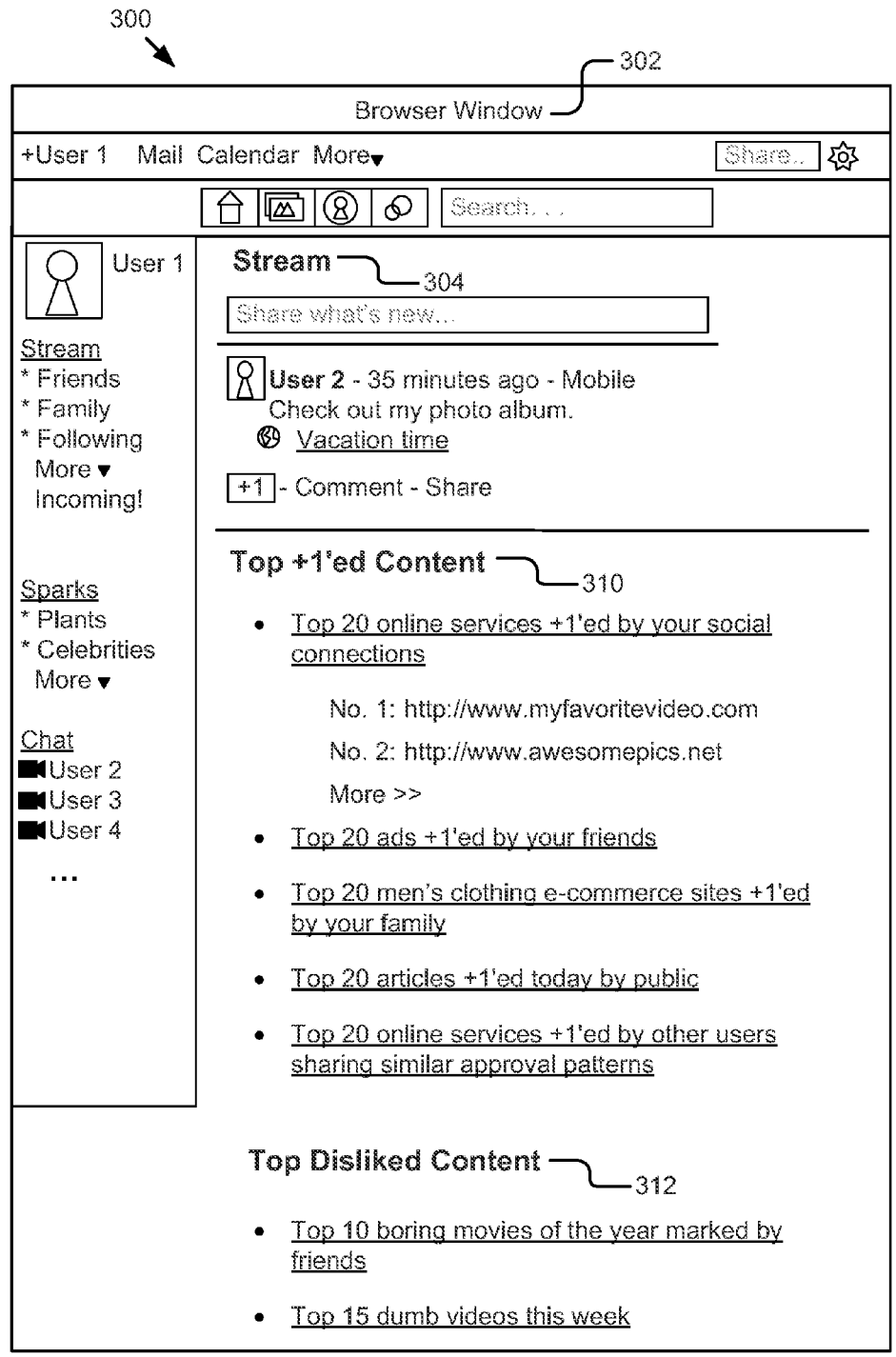
FIG. 3A is one example of a graphic representation of a user interface for providing noted items according to one embodiment.

In one embodiment, the presentation module 262 generates a list of noted items including the one or more top-ranking noted items and presents the list to a first user. For example, the presentation module 262 instructs the user interface module 264 to generate graphical data for presenting a list of top-ranking approved items to the first user via a user interface. An example of the user interface is illustrated in FIG. 3A.

Figure 3B:
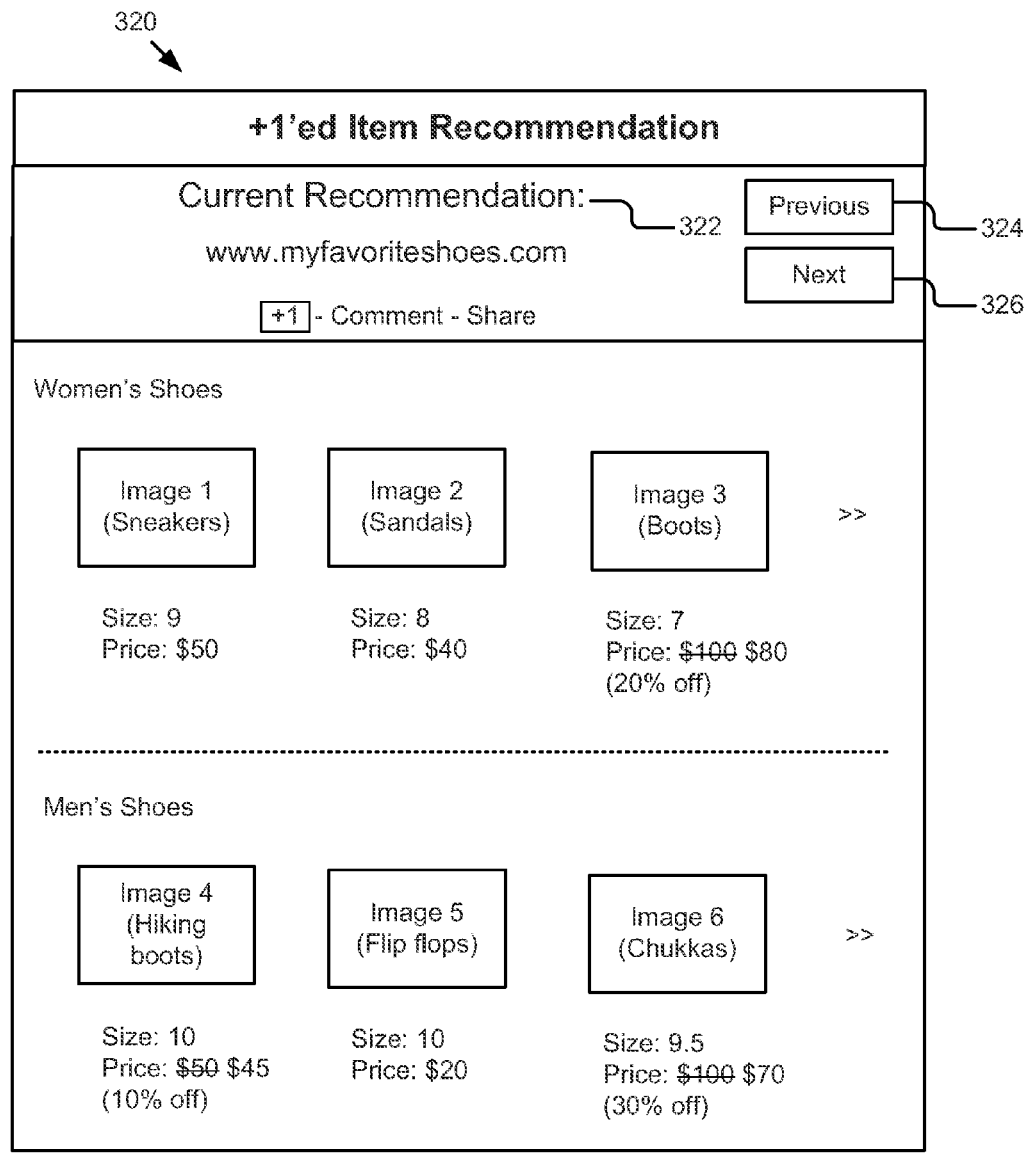
FIG. 3B is one example of a graphic representation of a user interface for providing noted items according to another embodiment.

In another embodiment, the presentation module 262 presents each of the one or more top-ranking noted items to the first user in a full screen browsing approach. For example, the presentation module 262 instructs the user interface module 264 to generate graphical data for presenting the top-ranking approved items to the first user via a user interface, allowing the first user to browse each of the approved items one by one using a browser (not pictured) of the user device 115. An example of the user interface is illustrated in FIG. 3B.

The user interface module 264 is software including routines for generating graphical data for providing user interfaces to users. In one embodiment, the user interface module 264 is a set of instructions executable by the processor 202 to provide the functionality described below for generating graphical data for providing user interfaces to users. In another embodiment, the user interface module 264 is stored in the memory 204 of the computing device 200 and is accessible and executable by the processor 202. In either embodiment, the user interface module 264 is adapted for cooperation and communication with the processor 202 and other components of the computing device 200.

In one embodiment, the user interface module 264 receives a set of noted items from the presentation module 262 and generates graphical data for providing a user interface that depicts the set of noted items. The user interface module 264 sends the graphical data to a user device 115 operated by a user, causing the user device 115 to present the set of noted items to the user via the user interface. In one embodiment, the user interface allows the user to browse each of the noted items in a full screen browsing approach. An example of the user interface is shown in FIG. 3B.

In another embodiment, the user interface module 264 receives a list of top-ranking noted items and generates graphical data for providing a user interface that depicts the list of top-ranking noted items. The user interface module 264 sends the graphical data to a user device 115, causing the user device 115 to provide the user interface depicting the list of top-ranking noted items to a user. An example of the user interface is shown in FIG. 3A. In yet another embodiment, the user interface module 264 generates graphical data for providing a user interface that allows a user to customize the presentation of the noted items using the user interface. Examples of the user interface are shown in FIGS. 3C and 3D.

Example User Interface

Turning now to FIG. 3A, one example of a graphical representation of a user interface 300 is illustrated. The user interface 300 includes a browser window 302. In this example, the user device 115 displaying the user interface 300 includes a large screen, such as one on a personal computer or a laptop, although the user interface 300 is easily converted to a display for a smaller screen, such as a screen on a tablet or a smart phone. In the illustrated embodiment, the browser window 302 includes a stream 304, approved items (e.g., top +1'ed content 310) and disapproved items (e.g., top disliked content 312), etc. The top +1'ed content 310 includes one or more lists of +1'ed items and the top disliked content 312 includes one or more lists of disapproved items.

FIG. 3B illustrates another example of a graphical representation of a user interface 320 for providing noted items to a user in a full screen browsing approach. In this example, the user interface 320 includes a current recommendation 322 of +1'ed items, which is an online service www.myfavoriteshoes.com. The content (e.g., women's shoes, men's shoes, etc.) of the approved online service www.myfavoriteshoes.com is shown in the user interface 320. The user interface 320 also includes a "Previous" button 324 and a "Next" button 326. When the "Previous" button 324 is clicked, a previous recommendation of +1'ed items would be shown in the user interface 320. However, when the "Next" button 326 is clicked, a next recommendation of +1'ed items would be shown in the user interface 320.

FIG. 3C illustrates an example of a graphical representation of a user interface 350 for customizing presentation of noted items. The user interface 350 is illustrated to create a list of approved items (e.g., +1'ed items) and display the list to a user according to some embodiments. In the illustrated example, the user interface 350 includes a first option 352 for specifying a type of content for the +1'ed items (e.g., sites, ads, articles, etc.), a second option 354 for specifying one or more social categories (e.g., a friend circle, a family circle, etc.) in the list, a third option 356 for specifying a period of time (e.g., today, this week, etc.) in the list and a fourth option 358 for specifying a number of +1'ed items included in the list. If the user clicks a "Create list" button 360, the noting application 103 generates a list of +1'ed items and presents the list to the user.

FIG. 3D illustrates an example of a graphical representation of a user interface 370 for customizing a search result of noted items. In this example, the user interface 370 includes one or more options 372 for specifying demographics information and a box 374 for providing additional information. If the user clicks a "search" button 376, approved items marked by other users satisfying the demographics information are presented to the user.

Example Methods

Figure 4:
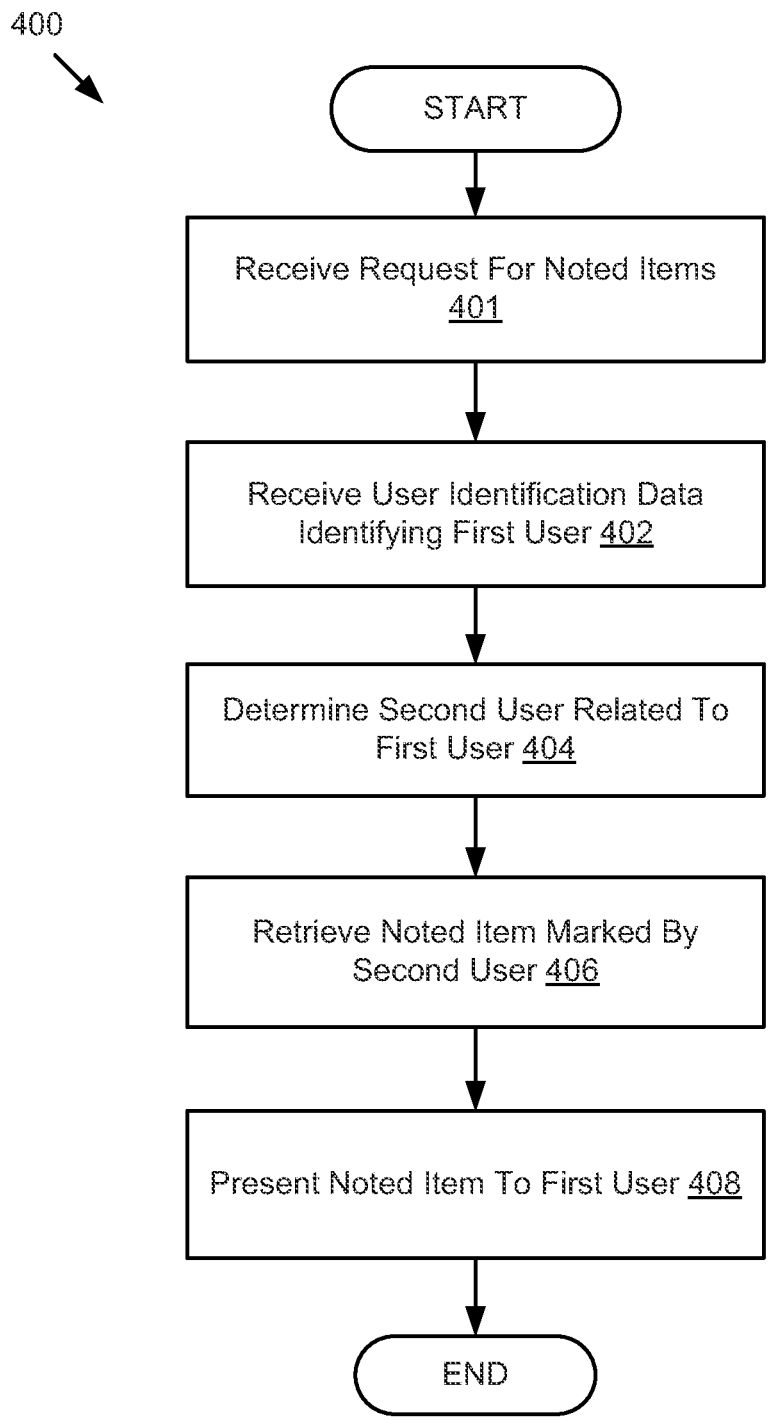
FIG. 4 is a flow diagram of one embodiment of a method for providing noted items.

Referring now to FIGS. 4-6B, various embodiments of the method for providing noted items will be described. FIG. 4 is a flow diagram of one embodiment of a method 400 for providing noted items to a first user. In the illustrated embodiment, the communication module 252 receives 401a request for noted items (either explicitly or implicitly) from the first user. In one embodiment, the request is a request for approved items such as favorite movies of the year rated by friends. In another embodiment, the request is a request for disapproved items such as the most boring story books. The communication module 252 receives 402 user identification data that identifies the first user. For example, the communication module 252 receives one or more of a user name, a password, an email address, a phone number, an IP address, etc. The communication module 252 sends the request and the user identification data to the determination module 256.

The determination module 256 determines 404 one or more second users related to the first user based at least in part on the user identification data. In one embodiment, the determination module 256 determines the one or more second users as other users whose noting patterns are related to a noting pattern of the first user. In another embodiment, the determination module 256 determines the one or more second users as members from one or more social categories such as "friend" and "family" circles of the first user.

The determination module 256 retrieves 406 a set of noted items marked by the one or more second users and sends the set of noted items to the presentation module 262. In one embodiment, the set of noted items are noted items marked by the one or more second users and not yet marked by the first user. The presentation module 262 presents 408 the set of noted items to the first user. For example, the presentation module 262 sends the set of noted items to a user device 115 operated by the first user, causing the user device 115 to present the set of noted items on a display device.

Figure 5A:
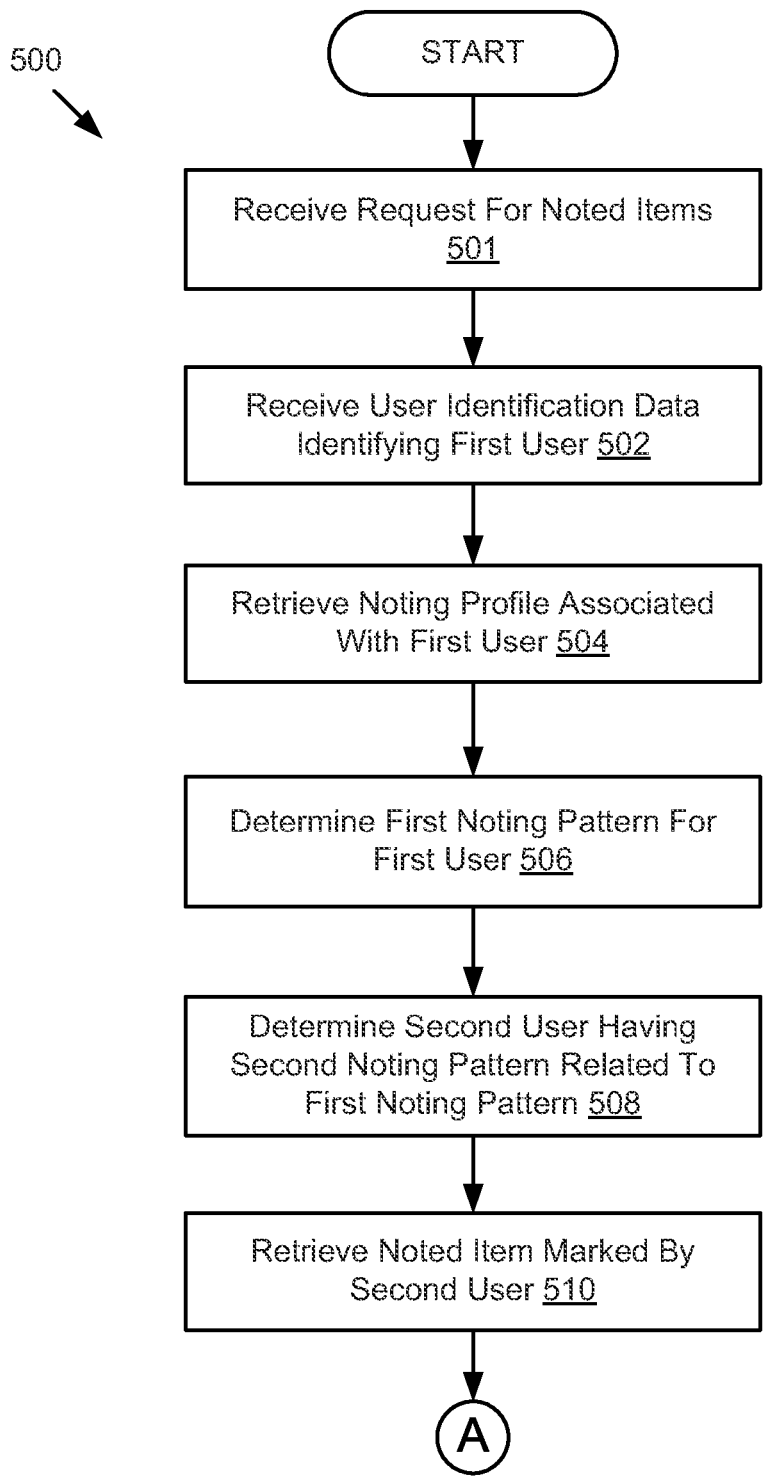
FIGS. 5A and 5B are flow diagrams of another embodiment of a method for providing noted items.
Figure 5B:
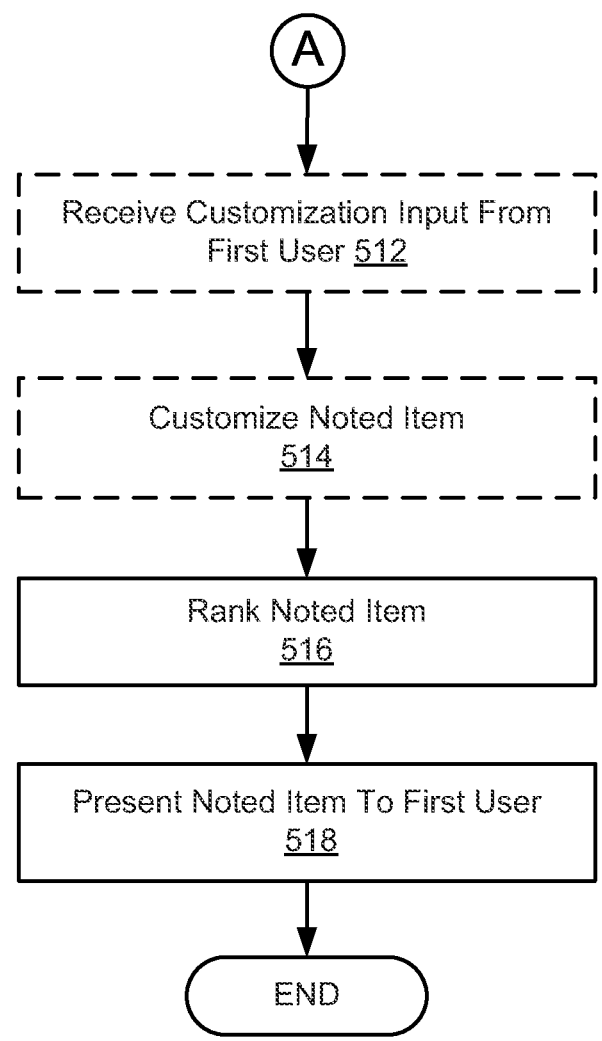

FIGS. 5A and 5B are flow diagrams illustrating a method 500 for providing noted items to a first user according to another embodiment. Turning to FIG. 5A, the communication module 252 receives 501a request for noted items from the first user. The communication module 252 receives 502 user identification data identifying the first user and sends the user identification data to the determination module 256. The determination module 256 retrieves 504 a noting profile associated with the first user from a storage 143 and determines 506 a first noting pattern for the first user from the noting profile. In one embodiment, the first noting pattern is a pattern formed by approved items marked by the first user. In another embodiment, the first noting pattern is a pattern formed by disapproved items marked by the first user. In yet another embodiment, the first noting pattern is a pattern formed by a combination of approved items and disapproved items marked by the first user.

The determination module 256 determines 508 one or more second users related to the first user as other users having a second noting pattern related to the first noting pattern. For example, the determination module 256 determines a second noting pattern for one or more other users. If at least a predetermined percentage (e.g., 80%) of the noted items included in the first noting pattern is also included in the second noting pattern, the determination module 256 determines the one or more other users as one or more second users related to the first user. In other words, the determination module 256 determines the one or more second users as other users who have also approved a first predetermined percentage (e.g., 80%) of the approved items or disapproved a second predetermined percentage (e.g., 85%) of the disapproved items that are marked by the first user.

The determination module 256 retrieves 510 a first set of noted items marked by the one or more second users from the storage 143. For example, the determination module 256 retrieves a first set of approved items marked by the one or more second users if the request received from the first user is a request for approved items. In another example, the determination module 256 retrieves a first set of disapproved items marked by the one or more second users if the request received from the first user is a request for disapproved items. In one embodiment, the first set of noted items includes one or more noted items marked by the one or more second users and not yet marked by the first user. The determination module 256 sends the first set of noted items to one or more of the customization module 258 and the ranking module 260.

Referring to FIG. 5B, steps 512 and 514 are depicted using dashed lines to indicate that they are optional features of the method 500. The communication module 252 receives 512 one or more customization inputs from the first user and sends the one or more customization inputs to the customization module 258. The customization module 258 customizes 514 the first set of noted items based at least in part on the one or more customization inputs. For example, if a customization input indicates a period of time as this week, the customization module 258 deletes all the noted items that are not published this week from the first set of noted items. The customization module 258 sends the first set of noted items after customization to the ranking module 260.

The ranking module 260 ranks 516 the first set of noted items to generate a second set of noted items. In one embodiment, the ranking module 260 ranks the first set of noted items based at least in part on the number of noting indications for each noted item. For example, if the first set of noted items includes a set of approved items, the ranking module 260 ranks the set of approved items based on the number of indications of approval (e.g., the number of +1s) associated with each approved item. A first approved item having more indications of approval than a second approved item has a higher ranking than the second approved item. In this example, the second set of noted items includes approved items such that a first approved item having a higher ranking than a second approved item is listed before the second approved item.

The ranking module 260 sends the second set of noted items to the presentation module 262. The presentation module 262 presents 518 the second set of noted items to the first user. In one embodiment, the presentation module 262 provides a top list including one or more top-ranking noted items (e.g., top 10 noted items) from the second set to the first user. In another embodiment, the presentation module 262 provides each of the one or more top-ranking noted items to the first user one by one using a full screen browsing approach.

Figure 6A:
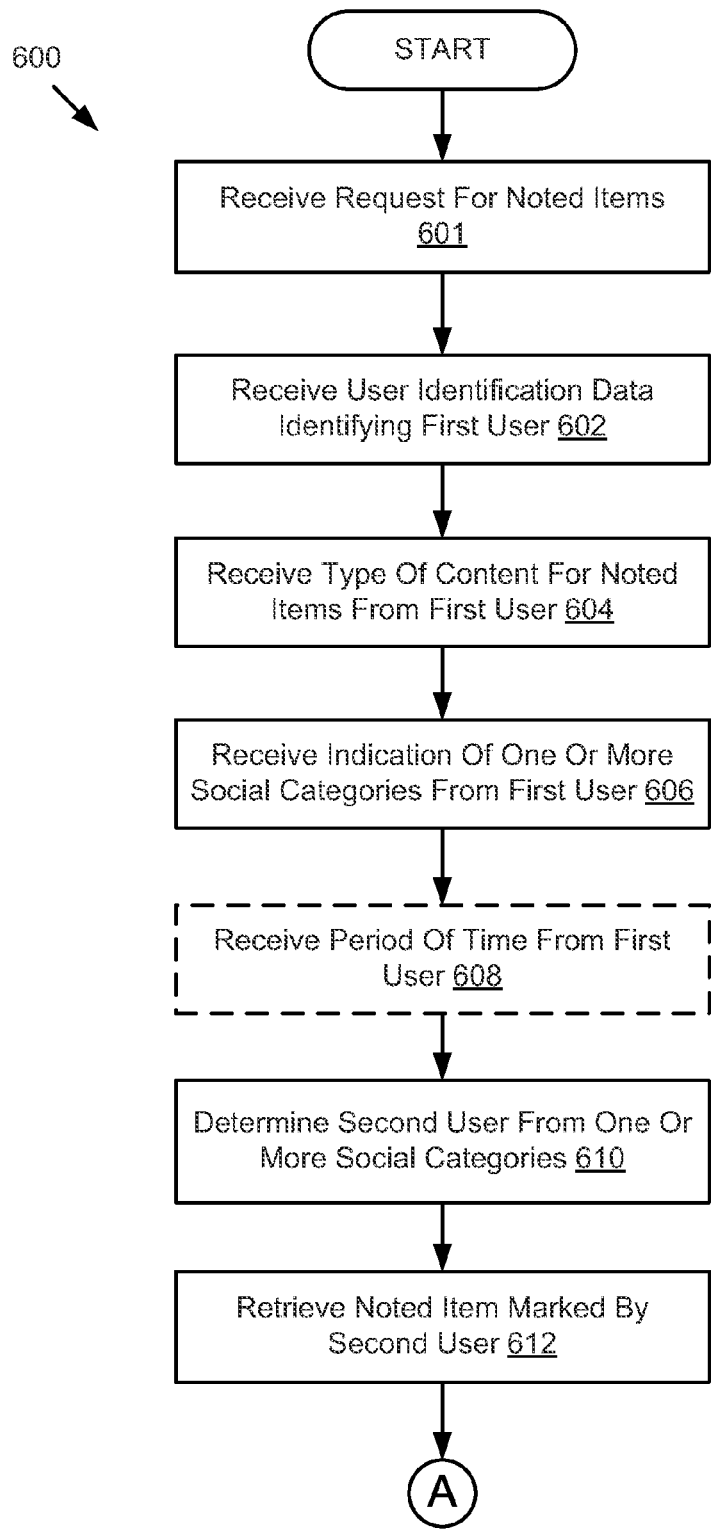
FIGS. 6A and 6B are flow diagrams of yet another embodiment of a method for providing noted items.
Figure 6B:
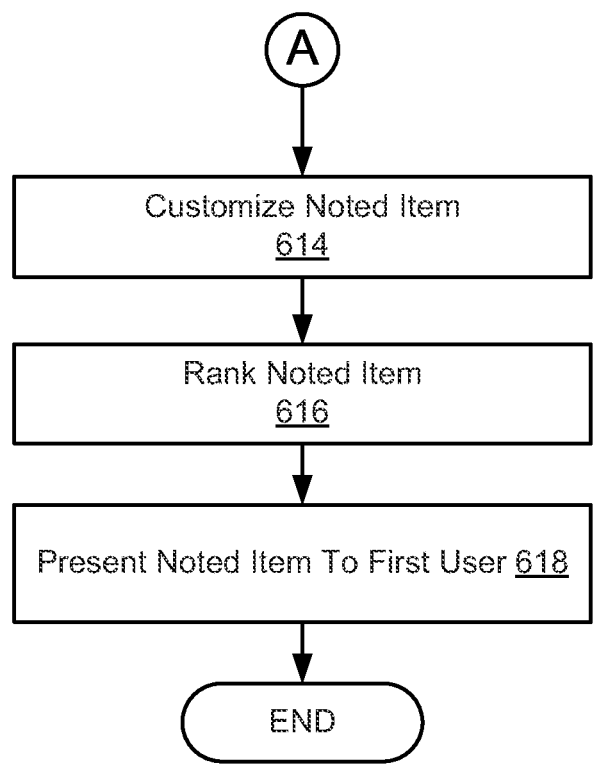

FIGS. 6A and 6B are flow diagrams illustrating a method 600 for providing noted items to a first user according to yet another embodiment. Referring to FIG. 6A, the communication module 252 receives 601 a request for noted items from a first user. The communication module 252 receives 602 user identification data identifying the first user and sends the user identification data to the determination module 256. The communication module 252 receives 604 a type of content for the noted items from the first user. In one embodiment, a type of content is one of sites, articles, videos, music, ads, and movies, etc. The communication module 252 receives 606 an indication of one or more social categories (e.g., a friend circle, a family circle, etc.) from the first user. Optionally, the communication module 252 receives 608 a period of time from the first user. The communication module 252 sends one or more of the type of content, the indication of one or more social categories and the period of time to the determination module 256 and the customization module 258.

The determination module 256 determines 610 one or more second users related to the first user as members from the one or more social categories. For example, if the one or more social categories include a friend circle and a family circle, the determination module 256 determines the one or more second users as members from the friend circle and/or the family circle. The determination module 256 retrieves 612 a first set of noted items marked by the one or more second users from the storage 143 and sends the first set of noted items to the customization module 258.

Referring to FIG. 6B, the customization module 258 customizes 614 the first set of noted items based at least in part on one or more of the type of content, the indication of one or more social categories and the period of time. The customization module 258 sends the first set of noted items after customization to the ranking module 260. The ranking module 260 ranks 616 the first set of note items to generate a second set of noted items. The ranking module 260 sends the second set of noted items to the presentation module 262, causing the presentation module 262 to present 618 the second set of noted items to the first user.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for providing electronically noted items, the method comprising:

receiving, using one or more computing devices, a request for electronically noted items from a first user;

receiving, using the one or more computing devices, user identification data identifying the first user;

aggregating, using the one or more computing devices, one or more noting indications associated with the first user based on a noting type to generate a noting profile associated with the first user, the noting indication describing whether the first user approves one or more items, the noting profile describing the one or more noting indications associated with the first user and the noting type including an approval status associated with the one or more items;

determining, using the one or more computing devices, one or more second users related to the first user based on the user identification data identifying the first user and the noting profile associated with the first user;

retrieving, using the one or more computing devices, a first set of two or more electronically noted items marked by the one or more second users;

ranking, using the one or more computing devices, the first set of two or more electronically noted items to generate a second set of two or more electronically noted items; and providing for display, using the one or more computing devices, the second set of two or more electronically noted items to the first user.

2. The method of claim 1, wherein determining the one or more second users related to the first user comprises:

retrieving the noting profile associated with the first user;

determining, based on the noting profile, a first noting pattern associated with the first user; and determining the one or more second users as one or more other users having one or more second noting patterns related to the first noting pattern.

3. The method of claim 1, further comprising:

receiving, using the one or more computing devices, one or more customization inputs from the first user; and customizing, using the one or more computing devices, the first set of two or more electronically noted items based on the one or more customization inputs.

4. The method of claim 3, wherein the one or more customization inputs include one or more of a type of content, a social category, a period of time, a number of electronically noted items included in a list of electronically noted items and demographics information.

5. The method of claim 1, wherein ranking the first set of two or more electronically noted items to generate the second set of two or more electronically noted items comprises:

determining two or more counts of noting indications associated with the first set of two or more electronically noted items; and ordering, based on the two or more counts of noting indications, the first set of two or more electronically noted items to generate the second set of two or more electronically noted items.

6. The method of claim 1, wherein providing for display the second set of two or more electronically noted items comprises:

determining one or more top-ranking electronically noted items from the second set of two or more electronically noted items;

generating a list of electronically noted items that includes the one or more top-ranking electronically noted items; and presenting the list of electronically noted items to the first user.

7. The method of claim 1, wherein providing for display the second set of two or more electronically noted items comprises:

determining one or more top-ranking electronically noted items from the second set of two or more electronically noted items; and presenting each of the one or more top-ranking electronically noted items to the first user in a full-screen browsing approach.

8. A system for providing electronically noted items, the system comprising:

one or more processors, the one or more processors being configured to:

receive a request for electronically noted items from a first user;

receive user identification data identifying the first user;

aggregate one or more noting indications associated with the first user based on a noting type to generate a noting profile associated with the first user, the noting indication describing whether the first user approves one or more items, the noting profile describing the one or more noting indications associated with the first user and the noting type including an approval status associated with the one or more items;

determine one or more second users related to the first user based on the user identification data identifying the first user and the noting profile associated with the first user;

retrieve a first set of two or more electronically noted items marked by the one or more second users;

rank the first set of two or more electronically noted items to generate a second set of two or more electronically noted items; and provide for display the second set of two or more electronically noted items to the first user.

9. The system of claim 8, wherein the one or more processors determine the one or more second users related to the first user by:

retrieving the noting profile associated with the first user;

determining, based on the noting profile, a first noting pattern associated with the first user; and determining the one or more second users as one or more other users having one or more second noting patterns related to the first noting pattern.

10. The system of claim 8, wherein the one or more processors are further configured to:

receive one or more customization inputs from the first user; and customize the first set of two or more electronically noted items based on the one or more customization inputs.

11. The system of claim 10, wherein the one or more customization inputs include one or more of a type of content, a social category, a period of time, a number of electronically noted items included in a list of electronically noted items and demographics information.

12. The system of claim 8, wherein the one or more processors rank the first set of two or more electronically noted items to generate the second set of two or more electronically noted items by:

determining two or more counts of noting indications associated with the first set of two or more electronically noted items; and ordering, based on the two or more counts of noting indications, the first set of two or more electronically noted items to generate the second set of two or more electronically noted items.

13. The system of claim 8, wherein the one or more processors provide for display the second set of two or more electronically noted items by:

determining one or more top-ranking electronically noted items from the second set of two or more electronically noted items;

generating a list of electronically noted items that includes the one or more top-ranking electronically noted items; and presenting the list of electronically noted items to the first user.

14. The system of claim 8, wherein the one or more processors provide for display the second set of two or more electronically noted items by:

determining one or more top-ranking electronically noted items from the second set of two or more electronically noted items; and presenting each of the one or more top-ranking electronically noted items to the first user in a full-screen browsing approach.

15. A computer program product comprising a non-transitory computer usable medium including a computer readable program, wherein the computer readable program when executed on a computer causes the computer to perform steps comprising:

receiving a request for electronically noted items from a first user;

receiving user identification data identifying the first user;

aggregating one or more noting indications associated with the first user based on a noting type to generate a noting profile associated with the first user, the noting indication describing whether the first user approves one or more items, the noting profile describing the one or more noting indications associated with the first user and the noting type including an approval status associated with the one or more items;

determining one or more second users related to the first user based on the user identification data identifying the first user and the noting profile associated with the first user;

retrieving a first set of two or more electronically noted items marked by the one or more second users;

ranking the first set of two or more electronically noted items to generate a second set of two or more electronically noted items; and providing for display the second set of two or more electronically noted items to the first user.

16. The computer program product of claim 15, wherein determining the one or more second users related to the first user comprises:

retrieving the noting profile associated with the first user;

determining, based on the noting profile, a first noting pattern associated with the first user; and determining the one or more second users as one or more other users having one or more second noting patterns related to the first noting pattern.

17. The computer program product of claim 15, wherein the computer readable program when executed on the computer causes the computer to perform steps further comprising:

receiving one or more customization inputs from the first user; and customizing the first set of two or more electronically noted items based on the one or more customization inputs.

18. The computer program product of claim 17, wherein the one or more customization inputs include one or more of a type of content, a social category, a period of time, a number of electronically noted items included in a list of electronically noted items and demographics information.

19. The computer program product of claim 15, wherein ranking the first set of two or more electronically noted items to generate the second set of two or more electronically noted items comprises:
- determining two or more counts of noting indications associated with the first set of two or more electronically noted items; and
- ordering, based at least in part on the two or more counts of noting indications, the first set of two or more electronically noted items to generate the second set of two or more electronically noted items.

20. The computer program product of claim 15, wherein providing for display the second set of two or more electronically noted items comprises:
- determining one or more top-ranking electronically noted items from the second set of two or more electronically noted items;
- generating a list of electronically noted items that includes the one or more top-ranking electronically noted items; and
- presenting the list of electronically noted items to the first user.

21. The computer program product of claim 15, wherein providing for display the second set of two or more electronically noted items comprises:
- determining one or more top-ranking electronically noted items from the second set of two or more electronically noted items; and
- presenting each of the one or more top-ranking electronically noted items to the first user in a full-screen browsing approach.

* * * * *